United States Patent [19]

Herrington

[11] Patent Number: 4,618,383

[45] Date of Patent: Oct. 21, 1986

[54] METHOD AND APPARATUS FOR THE MANUFACTURE OF PLASTIC BAGS HAVING INTERLOCKING PROFILE EXTRUSIONS

[75] Inventor: Fox J. Herrington, Holcomb, N.Y.

[73] Assignee: Mobil Oil Corporation, New York, N.Y.

[21] Appl. No.: 708,612

[22] Filed: Mar. 5, 1985

Related U.S. Application Data

[63] Continuation-in-part of Ser. No. 623,623, Jun. 22, 1984, Pat. No. 4,561,109, which is a continuation of Ser. No. 433,588, Oct. 12, 1982, abandoned.

[51] Int. Cl.⁴ .............................................. B29D 5/00
[52] U.S. Cl. .......................................... 156/66; 24/576; 24/587; 156/164; 156/204; 156/244.25; 156/459; 156/465; 156/499; 156/500; 264/177 R; 383/63; 383/95
[58] Field of Search ................... 24/576, 587; 156/66, 156/164, 204, 244.25, 459, 499, 500, 465; 383/63, 95; 264/177 R

[56] References Cited

U.S. PATENT DOCUMENTS

| | | |
|---|---|---|
| Re. 28969 | 9/1976 | Natio . |
| 3,226,787 | 1/1966 | Ausnit . |
| 3,421,960 | 1/1969 | Arbit . |
| 3,462,332 | 8/1969 | Goto . |
| 3,468,995 | 9/1969 | Nelson . |
| 3,532,571 | 10/1970 | Ausnit . |
| 3,773,590 | 11/1973 | Morgan . |
| 3,784,432 | 1/1974 | Noguchi . |
| 3,787,269 | 1/1974 | Noguchi . |
| 3,932,257 | 1/1976 | Noguchi . |
| 3,945,872 | 3/1976 | Noguchi . |
| 4,212,337 | 7/1980 | Kamp . |
| 4,279,677 | 7/1981 | Takahashi ..................... 156/160 |
| 4,306,924 | 12/1981 | Kamp . |
| 4,392,897 | 7/1983 | Herrington . |
| 4,419,159 | 12/1983 | Herrington ..................... 156/66 |
| 4,428,788 | 1/1984 | Kamp . |

*Primary Examiner*—Robert A. Dawson
*Attorney, Agent, or Firm*—Alexander J. McKillop; Michael G. Gilman; Charles J. Speciale

[57] ABSTRACT

In the manufacture of plastic bags having interlocking profiled extrusions for the closure, the extruded plastic profiles are applied to a moving web of film immediately after extrusion of the profiles. The profiles are fused to the web on a first section of a fusing/cooling arcuate plate-like support member. Thereafter, the web is moved to a second cooled section of the arcuate plate-like support which is maintained at a temperature to allow the profiles to freeze to the web. The moving web of film is maintained under tension so that contraction of the film upon release compensates for the contraction of the locking profile as it cools to prevent puckering of the web. The locking profiles are applied to the web in an in-line process, which includes folding and heat sealing the moving web of film to form plastic bags.

16 Claims, 12 Drawing Figures

METHOD AND APPARATUS FOR THE MANUFACTURE OF PLASTIC BAGS HAVING INTERLOCKING PROFILE EXTRUSIONS

CROSS-REFERENCE TO RELATED APPLICATIONS

This application is a continuation-in-part of application Ser. No. 623,623, filed June 22, 1984, now U.S. Pat. No. 4,561,109 which in turn is a continuation of application Ser. No. 433,588, filed Oct. 12, 1982, now abandoned.

BACKGROUND OF THE INVENTION

1. Field of the Invention

This invention relates to apparatus for and a method of applying locking profile extrusions to a moving web of plastic film during the manufacture of plastic bags from the film.

2. Description of Prior Art

Various closure arrangements have been employed for closing plastic bags. U.S. Pat. No. Re. 28,969 to Naito shows the Zip-loc storage bag, in which a profile extrusion on one side of the bag mates with a profile extrusion on the other side of the bag to form an interlocking, reclosable closure. The interlocking profiles of this closure are integral with the plastic film of the bag. The extrusion of the interlocking profiles is part of the plastic film making machinery. This adversely affects the speed of the film making machinery. Also, the interlocking profiles preferably extend from a heavier gauge film than would otherwise be required if the locking profiles were not extruded during the film making. This process restricts film gauge reduction, which is a significant cost savings in the production of plastic bags. Another disadvantage of extruding the interlocking profiles during manufacture of the plastic film is that the interlocking profiles must necessarily be of the same resin as the plastic film.

U.S. Pat. No. 3,226,787 to Ausnit similarly shows apparatus for extruding the interlocking profiles during the fabrication of the plastic sheet, which adversely affects speed.

U.S. Pat. No. 4,212,337 to Kamp shows a closure device made from a heat sealable film in a separate step after the manufacture of the film. Heat is transferred through the film to produce melting at the interface of the film and the closure device to attach the closure to the film. This type of attachment is a slow process, which cannot practically be performed to take advantage of in-line bag manufacture which includes extrusion, folding and bag making in a continuous in-line process.

In practice, the extruded interlocking closures of the prior art are integral with a narrow strip of film which is heat sealed to the plastic film. Making the closure on a separate strip of film for later attachment almost doubles the required amount of plastic material, thereby increasing the cost of the bag greatly. These disadvantages are also inherent in other presently practiced manufacturing techniques, wherein the closure is separately manufactured and then applied to the plastic film after it has been manufactured. Other techniques of attaching such separate locking profiles to the film include the use of ultrasonic seals, which have the same disadvantages.

It is an object of the present invention to extrude locking profiles which are heat sealed to the plastic film during an in-line manufacturing process.

It is another object of the present invention to provide a plastic bag manufacturing apparatus and process which do not have the aforementioned disadvantages of the prior art and which provide an efficient and economic bag manufacture.

It is another object of the present invention to maintain a temperature differential between a molten thermoplastic extruded locking profile and a moving web of film from which the bag is formed, so that the molten thermoplastic adheres to the moving web upon contact and thereafter cools in a manner which prevents puckering of the moving web.

It is still another object of the present invention to provide a plastic bag manufacturing apparatus and process which employs a fusing/cooling arcuate support member to attach extruded locking profiles to a moving film web.

SUMMARY OF THE INVENTION

In accordance with the present invention, a locking plastic profile is extruded and applied to a plastic film. The temperature of the film is maintained warm enough that the interface will reach a temperature at which the materials will fuse together, but cool enough that the film will not distort. Upon cooling, the extruded thermoplastic is set in the desired locking profile.

In accordance with another aspect of the invention, the moving web of film is maintained under tension so that contraction of the film upon release compensates for the contraction of the locking profile as it cools. This prevents puckering of the moving web of film.

In accordance with another aspect of the invention, the plastic film is passed over an optionally heated first section of a fusing/cooling arcuate support member wherein extruded plastic profiles and film fuse together, and thereafter the profiles are frozen to the moving film on a second cooled section of the support member.

The foregoing and other objects, features and advantages of the invention will be better understood from the following detailed description of the invention provided in connection with the accompanying drawings.

DESCRIPTION OF THE PREFERRED EMBODIMENTS

Figure 1:
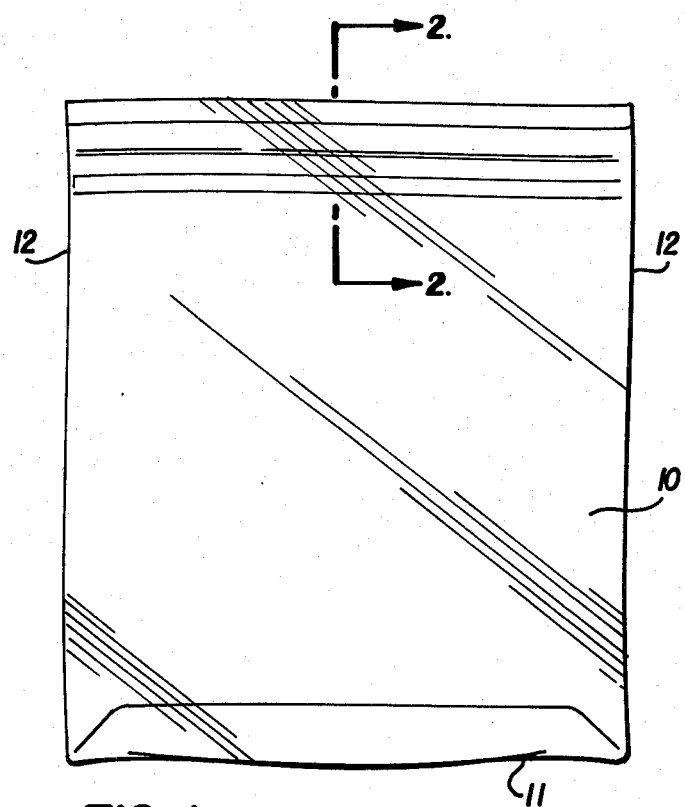
FIG. 1 shows a plastic bag having a locking profile made in accordance with the present invention.
Figure 2:
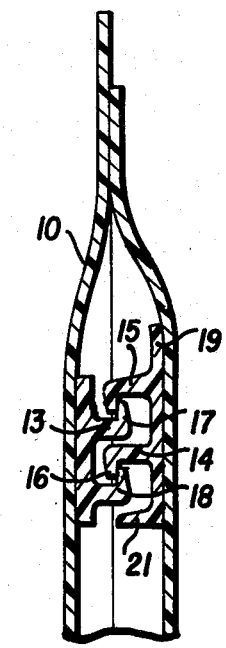
FIG. 2 is a section on the lines 2—2 of FIG. 1, showing the locking profile in more detail.
Figure 3:
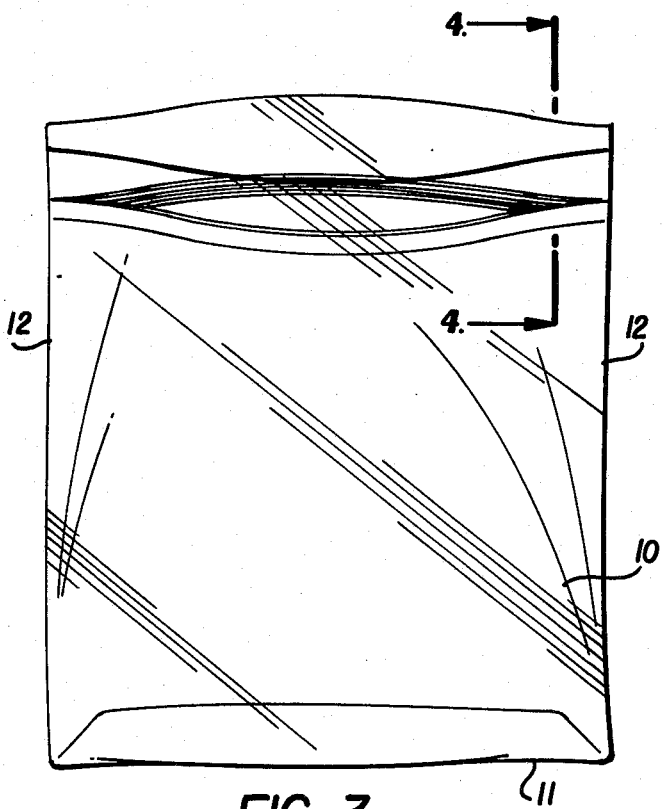
FIG. 3 shows the plastic bag with the closure partially open.
Figure 4:
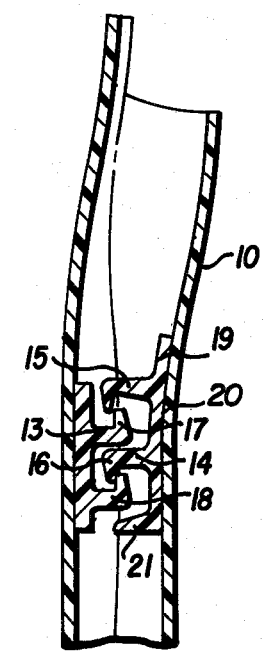
FIG. 4 is a section on the line 4—4 of FIG. 3.

Referring to FIGS. 1-4, a plastic bag 10 is formed from a thin, plastic film which is folded at the bottom 11 and is heat sealed along the sides 12 to form a pouch. Locking profiles 13 and 14 along the inside of the top of the bag form a reclosable closure. Each of the locking profiles includes locking protrusions, such as 15, 16 and 17, 18. These hook-shaped protrusions mate to lock the closure when they are pressed together. The protrusions are flexible so that the locking closure can be easily separated and then reclosed.

The closure includes a fin 19 which extends toward the outside of the bag on the side extending away from the hook on the locking protrusion 15. When the layers of film are pulled apart from outside the bag, the fin 19 provides leverage which bends the hook outwardly, releasing it from the adjacent hook on protrusion 17. The profile 14 has a "weak point" at 20, which allows deflection so that the locking protrusion 15 can move outwardly. This leverage does not exist when force is exerted to pull the film apart from inside the bag.

The optional vertical extension 21 at the bottom end of the profile 14 holds the locking protrusion 15 so that it cannot release under force from inside the bag. In this manner, the bag tenaciously resists opening by the contents from inside the bag, but it opens easily by hand from the outside.

The protrusions 15 and 16 extend from a common base and the protrusions 17 and 18 extend from a common base. The protrusions are uniform, with the hooks on protrusions 15 and 16 extending in one direction and the hooks on protrusions 17 and 18 extending in the other direction. These profiles are easily extruded and applied to the plastic film forming the bag in an in-line manufacturing process.

Figure 5:
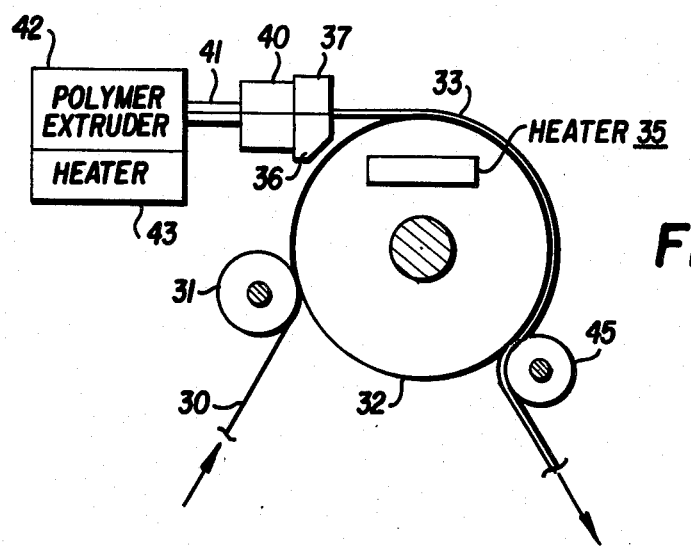
FIG. 5 is a diagrammatic drawing of one embodiment of the apparatus of the present invention using a heating roll.
Figure 6:
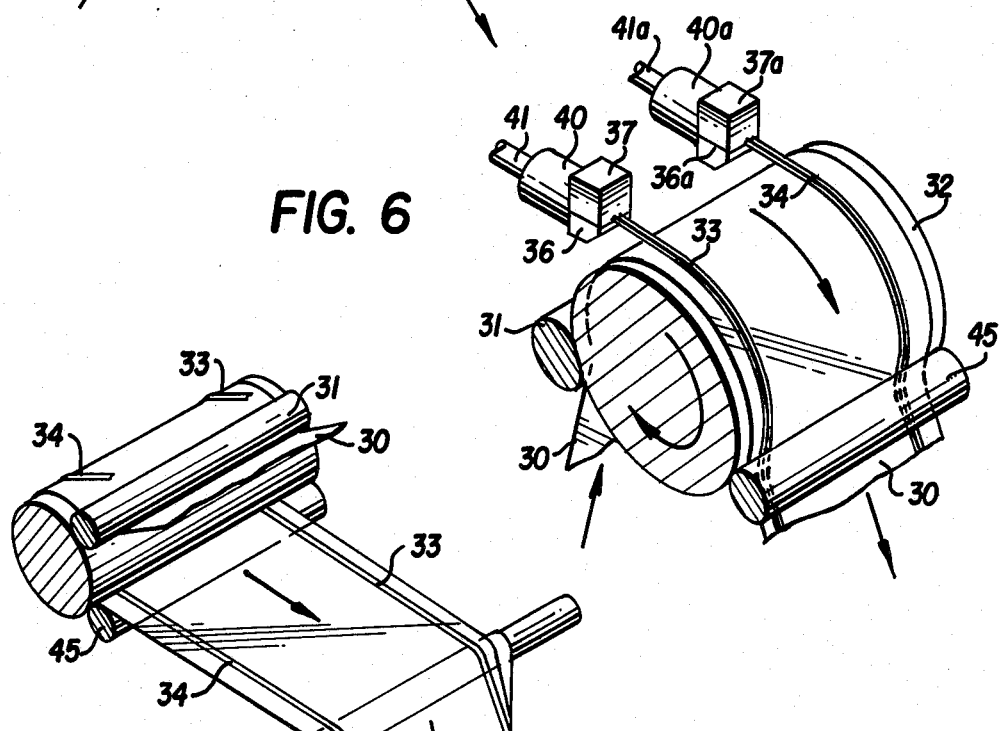
FIG. 6 shows the extruding assembly.
Figure 7:
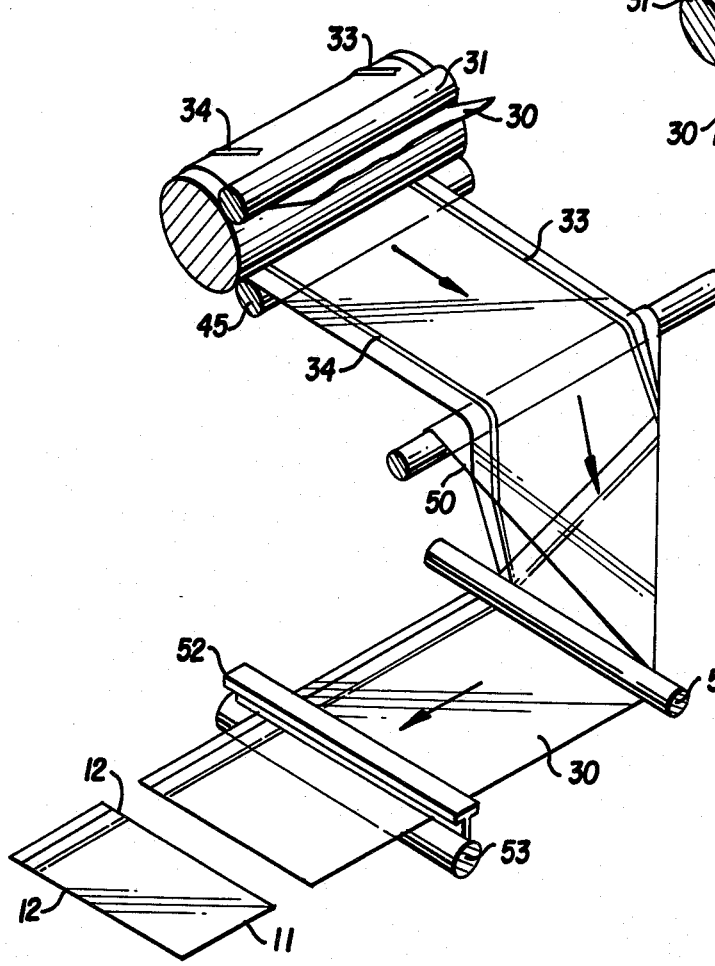
FIG. 7 is a perspective view of the bag forming apparatus in accordance with the present invention.

Apparatus in accordance with one embodiment of the present invention for making these bags is shown in FIGS. 5-7, which depict a continuous web of a thermoplastic film 30, e.g., polyethylene, moving between first nip roller 31 and a backup roller 32. As film 30 passes over backup roller 32, it is contacted by profile extrusions 33 and 34 (FIG. 6). The film passes between backup roller 32 and a second nip roller 45 and on to further processing, including heat sealing of the bag sides.

Two extruding assemblies are positioned adjacent to backup roller 32 and moving film 30 to apply the profile extrusions 33 and 34 to the moving film 30 on the side of the film opposite first or backup roller 32. Each extruding assembly comprises a feed block 40, 40a and profile extrusion die blocks 36 and 37 and 36a and 37a. Die blocks 36 and 37 are connected to the feed block 40, which is fed through pipe 41 by a source of molten thermoplastic, shown in FIG. 5 as a polymer extruder 42 with a heater 43. A heater 35 (FIG. 5) is used to maintain backup roller 32 at a desired temperature. This maintains the temperature of the moving web of film warm enough that the interface with the extrusion is at a temperature at which the materials fuse together. To make the profile adhere to the film, it is necessary to have a sufficiently high temperature where they join together. The temperature must be cool enough that the film will not distort. This is achieved by the proper combination of molten thermoplastic temperature and backup roller temperature. The backup roller must be sufficiently cool to prevent distortion of the film where it contacts the hot profile. It has been found that when the backup roller 32 is maintained at a warmer temperature, the required molten thermoplastic temperature is lower. A satisfactory operation has been achieved with a molten polyethylene temperature of 300° F. (150° C.) at a film speed of 32 feet (9.75 m) per minute for 1.3 mil film. Both the film and the extrusion comprise low density polyethylene.

In order to maintain the moving web of film 30 under tension when the strip is being applied, first nip roller 31 and second nip roller 45 press the film 30 against the backup roller 32. The backup roller 32 is adjusted at a preselected tension to remove any ripples that may occur in the film 30. It is necessary to tension the film at the point where the profile joins it, in order to avoid distortion or puckers. If the film tension is low, then in the final product the film is puckered along the profiles. This is caused by shrinking of the profile as it cools. Applying tension to the film stretches it elastically, so that when it is released it contracts. If the amount of tension is proper, the contraction will be the same as the shrinking of the profile and the product will be smooth. If there is too much tension, then the film will try to contract more than the profile shrinks, and the profile will be rippled in large bends.

Apparatus in accordance with a second embodiment of the present invention for applying extruded profiles to film 30 is shown in FIGS. 9-12. In this embodiment, a continuous web of thermoplastic film 30 is delivered to a fixed fusing/cooling arcuate plate-like support member 64. Extruded profiles 66 and 68 are fused to the moving web 30 on a first section 64a of the arcuate support member and thereafter the moving web, having profiles, is delivered to a second section 64b of the arcuate support member where the profiles are frozen to the moving web 30.

Figure 10:
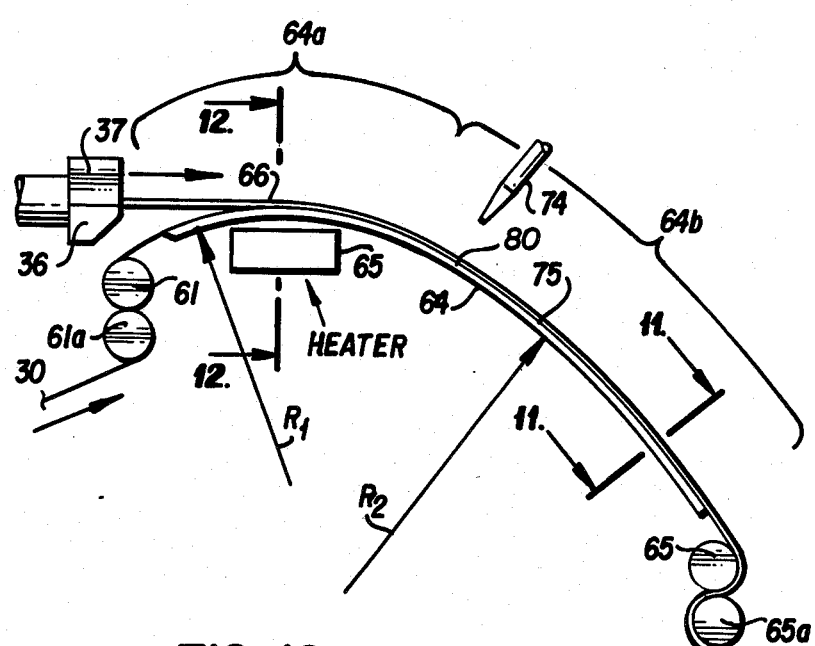
FIG. 10 shows the arcuate support member in combination with a cooling nozzle.
Figure 11:
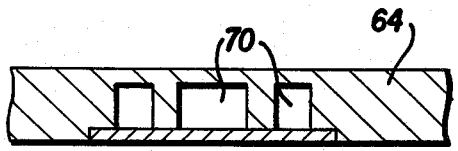
FIG. 11 is a section on lines 11—11 of FIG. 10, showing the cooling channels of the fusing/cooling arcuate support member.
Figure 12:
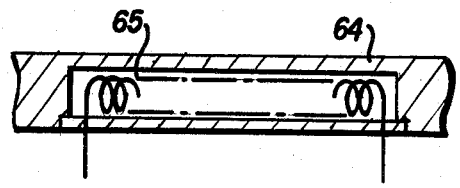
FIG. 12 is a section on lines 12—12 of FIG. 10, showing a heater positioned within the fusing/cooling arcuate support member.

The arcuate support member 64 is formed of the two curved sections 64a, 64b shown in FIG. 10. The first section 64a has a radius of curvature $R_1$ of, for example, 10 inches (25.4 cm) and a curved length of 6 inches (15.24 cm). The second section 64b has a larger radius of curvature $R_2$ of, for example, 120 inches (10 feet; 3.05 meters) and a curved length of 30 inches (2.5 feet; 0.76 meters). The arcuate support member is preferably constructed of aluminum, which has excellent heat transfer properties. The entire surface of arcuate support member 64 is coated with a thin film 75 of Teflon and is subject to hard anodizing to prevent the film web 30 from sticking to it and for wear resistance.

The first section 64a of the arcuate support member is designed to receive a moving web 30 of film which will be contacted by extruded profiles. The radius and the curved length of section 64a make it possible for the profiles to contact the web with a low angle of attack and at a fusing position which does not change dramatically with changes in die positioning. The second section 64b of the arcuate support member is less drastically curved than the first so that as the web of film moves over the second section the web is subjected to a lessened frictional drag and can be more easily delivered to additional processing units. The second section 64b of the arcuate support member is cooled with a coolant flowing through cooling channels 70, and these channels are used to keep this section at a desired temperature so that the fused profiles will freeze to the moving web. To prevent excessive condensation in other areas of web 30, the cooling channels 70 may be provided only in areas of the second section 64b over which the profiles pass.

The combination of the two curved sections 64a, 64b makes it possible to more simply and easily construct a bag-making machine than when a roller is used, as in the prior embodiment. The radii and curved lengths for the arcuate support member can also be chosen to have greater dimensions than is practical for a roller. Additionally, the first section of the arcuate support member 64 is optionally heated to improve the fusion of the profiles by heating the film web 30 to a temperature below its melting point, and the support member design permits heating or cooling thereof in specific regions. Heating or cooling a revolving roller in specific regions is more difficult to accomplish.

Figure 9:
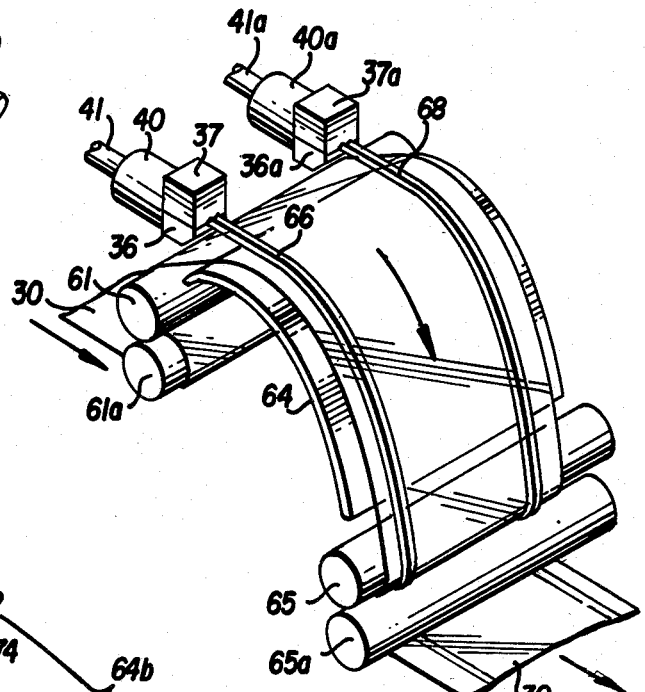
FIG. 9 is a diagrammatic drawing of another embodiment of the present invention showing a fusing/cooling arcuate support member.

The use of the arcuate support member 64 for the extrusion of profiles on a film web will now be described in connection with FIGS. 9 and 10.

A continuous thermoplastic film 30 moves between a first pair of nip rolls 61 and 61a, which feed the film over the fusing/cooling arcuate support member 64.

On delivery of the web to the arcuate support member 64, profiles 66 and 68 are extruded, as described earlier with reference to the first (FIGS. 5 and 6) embodiment of the invention, and contact the top surface of the film web 30 on a web surface opposite the web surface supported by the support member 64. Profiles 66, 68 and web 30 contact with each other on the first, curved section 64a of the support member. In this section, the profiles 66, 68 are fused to the web. To improve the fusing operation, the first section may be optionally heated to a temperature below the melting point of the film by a heater 65 positioned beneath or within the first section 64a of support member 64.

Profiles 66 and 68 are extruded from die assemblies adjacent to the arcuate support member, in the manner discussed above with respect to FIG. 6. After fusion, the moving web 30 having fused profiles thereon is transferred to the second section 64b, which is cooled by a coolant flowing in cooling channels 70. As a result, the fused profiles are frozen into position on the moving web 30. Upon reaching the second section 64b, the profiles are simultaneously air cooled by an air delivery nozzle 74, positioned above the surface of film web 30 which supports the profiles.

On leaving the arcuate support member 64, the film web 30, now having profiles 66 and 68 firmly attached thereto, passes through a second pair of nip rolls 65 and 65a positioned at the downstream end of support member 64 before moving on for further processing.

Nip rolls 61 and 61a and 65 and 65a impart a predetermined tension to the film web 30 as it passes over support member 64. Rolls 61 and 61a and/or rolls 65, 65a, can be eliminated when the upstream and/or downstream film handling equipment provides the required tension for film web 30 as it passes over the support member 30. As described hereinbefore, if film tension is too low, puckering can occur in the final product. If the tension is too large, the film will try to contract more than the profile shrinks, causing the profiles to be rippled in large bends.

FIG. 7 shows the apparatus of the present invention in an in-line manufacturing process for making plastic bags. After leaving either the heated roll 32 (FIGS. 5 and 6) or the arcuate support member 64 (FIGS. 9 and 10) (FIG. 7 shows the film leaving the heated roll 32), the film 30, having the extruded profiles attached thereto, passes over a triangular board 50 which is part of a center folder. After passing over the roller 51, the film is folded with the profiles on the mating, inside surfaces of the film. The film must be guided carefully so that the profiles will mate exactly when they join.

A heated foot squeezes the zipper in a localized area to close it. Hot seal bar 52 presses the film against backup roll 53 to seal the side of the bag and detach the bags. One bag has been shown detached at the end of the roll in FIG. 7, the bottom 11 and sides 12 being indicated.

Figure 8:
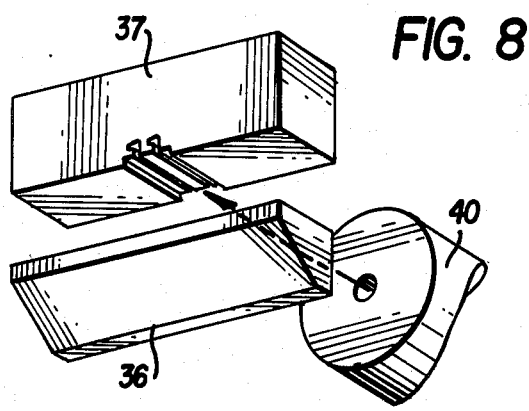
FIG. 8 shows the extruder in more detail.

FIG. 8 shows an extruding assembly including a feed block 40, and a shaping portion including upper die block 37 and lower die block 36. Resin flows through the opening in feed block 40 and is extruded through the profile shape in the upper die block 37. One expedient way to cut this shape is by wire EDM (electric discharge machining). Like a jigsaw, the wire moves along its axis slowly. The block moves in a programmed path to cut the desired shape.

Although particular embodiments of the invention have been shown and described, various modifications may be made. For instance, in the second embodiment it is possible to employ two serially arranged slightly separated arcuate support members, one for fusing the profiles to film web 30 and one for cooling and thus freezing the profiles, instead of a single fusing/cooling support member. Separate arcuate support members are shown in FIG. 10 by phantom lines. A slight gap 80 between the phanom lines indicates the existence of separate members. Alternatively, it is possible that instead of using two separated arcuate support members, a roll could be used for one or the other.

While specific embodiments of the method and apparatus aspects of the invention have been shown and described, it should be apparent that many modifications can be made thereto without departing from the spirit and scope of the invention. Accordingly, the invention is not limited by the foregoing description, but is only limited by the scope of the claims appended thereto.

I claim:

1. An apparatus for attaching locking profile extrusions to a plastic film, comprising:
   first and second serially arranged arcuate plate-like support sections for receiving and supporting a web of film;
   means for moving a web of film over said first and then said second arcuate plate-like support sections;
   an extruding assembly positioned adjacent to said moving web, comprising first and second means for extruding first and second locking profiles onto said web while said web is positioned on said first arcuate plate-like support section, and means for supplying molten thermoplastic to said extruding assembly;
   means for cooling said profiles while on said second arcuate plate-like support section to freeze said profiles onto said web; and
   means for maintaining said moving web under tension as it passes over said first and second arcuate plate-like support sections so that upon release of said moving web contraction of said film upon release compensates for the contraction of said profiles as the profiles cool to prevent puckering of said moving web.

2. The apparatus as in claim 1, wherein each of said first and second arcuate plate-like support sections are formed as integral first and second sections of a single arcuate plate-like support member.

3. The apparatus as in claim 1, wherein each of said first and second serially arranged arcuate plate-like support sections are separate arcuate plate-like support members.

4. The apparatus as in claim 3, wherein said first section arcuate plate-like support member is curved over its entire length and said second section arcuate plate-like support member is curved over its entire length, and wherein the radius of said first section arcuate plate-like support member is smaller relative to the radius of said second section arcuate plate-like support member.

5. The apparatus as in any one of claims 1, 3 or 4, further comprising means for heating said first arcuate plate-like support section to a temperature below the melting point of said film web.

6. The apparatus as in any one of claims 1, 3 or 4, further comprising means for simultaneously air-cooling the film web and profiles extruded thereon while said web is over said second arcuate plate-like support section.

7. The apparatus as in claim 1, further comprising:
means for folding said plastic film so that the first locking profile mates with said second locking profile; and
means for heat sealing the two folded layers of said plastic film along lines extending across the width thereof and at successive positions along the length of said film to form bags closed by said heat sealed lines along two sides closed by the folded plastic film at the bottom, and having an opening at the top which is closable by said locking profiles.

8. The apparatus recited in claim 1, wherein each of said means for extruding includes an extrusion die having an opening for extruding a base and a plurality of openings extending therefrom for extruding hook-shaped protrusions extending from said base.

9. The apparatus recited in claim 4, wherein said arcuate plate-like support member is curved over its entire length and has a smaller radius and a smaller curved length in said first section and a larger radius and a larger curved length in said second section.

10. A method of attaching locking profile extrusions to a plastic film, comprising:

moving a web of film over first and second serially arranged arcuate plate-like support sections for receiving and supporting a film web;
extruding from an extruding assembly first and second locking profiles of molten thermoplastic onto said moving web;
joining said profiles and said web on a fusing section of said first arcuate plate-like support section;
freezing said profiles to said web on said second arcuate plate-like support section; and
maintaining said moving web under tension as it passes over said first and second arcuate plate-like support sections so that contraction of said film upon release of said tension compensates for the contraction of said profiles as said profiles cool to prevent puckering of said moving web.

11. The method as in claim 10, wherein each of said first and second plate-like support sections are formed as integral sections of a single arcuate plate-like support member.

12. The method as in claim 10, wherein each of said first and second serially arranged arcuate plate-like support sections are separate arcuate plate-like support members.

13. The method as in claim 12, wherein said first section arcuate plate-like support member is curved over its entire length and said second section arcuate plate-like support member is curved over its entire length, and wherein the radius of said first section arcuate plate-like support member is smaller relative to the radius of said second section arcuate plate-like support member.

14. The method as in any one of claims 10, 12 or 13, further comprising heating the fusing section to a temperature below the melting point of said film.

15. The method as in any of claims 10, 12 or 13, further comprising air-cooling the web and the profiles thereon while the web is on said second arcuate plate-like support sections.

16. The method as in claim 10, further comprising:
folding said plastic film so that the first-named locking profile mates with said second locking profile; and
heat sealing the two folded layers of said plastic film along lines extending the width thereof and at successive positions along the length of said film to form bags closed by said heat sealed lines along two sides, and having an opening at the top which is closable by said locking profiles.

* * * * *